(12) United States Patent
Hung et al.

(10) Patent No.: US 7,657,774 B1
(45) Date of Patent: Feb. 2, 2010

(54) LOW POWER MEMORY CONTROLLER WITH LEADED DOUBLE DATA RATE DRAM PACKAGE ON A TWO LAYER PRINTED CIRCUIT BOARD

(75) Inventors: Eric Hung, San Jose, CA (US); Geeta K. Desai, Saratoga, CA (US); Vijendra Kuroodi, Cupertino, CA (US); Alexander Miretsky, Mountain View, CA (US); Mirko Vojnovic, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 12/140,144

(22) Filed: Jun. 16, 2008
(Under 37 CFR 1.47)

Related U.S. Application Data (63) Continuation of application No. 10/728,492, filed on Dec. 5, 2003, now Pat. No. 7,409,572.

(51) Int. Cl.
*G06F 1/00* (2006.01)
*G06F 1/04* (2006.01)
*G06F 12/00* (2006.01)
*H05K 1/00* (2006.01)

(52) U.S. Cl. ............ 713/500; 713/322; 713/600; 711/105; 361/748

(58) Field of Classification Search ............ 713/322, 713/500, 600; 711/105; 361/748
See application file for complete search history.

(56) References Cited

U.S. PATENT DOCUMENTS

| 5,239,639 | A | | 8/1993 | Fischer et al. |
| 5,260,892 | A | | 11/1993 | Testa |
| 5,448,715 | A | | 9/1995 | Lelm et al. |
| 5,638,083 | A | * | 6/1997 | Margeson .......... 345/10 |
| 5,686,764 | A | | 11/1997 | Fulcher |

(Continued)

OTHER PUBLICATIONS

Holm, "The Printed Circuit Board Primer," Aug. 10, 2001, retrieved from the Internet at www.tomshardware.com.

(Continued)

*Primary Examiner*—Ji H Bae (57) ABSTRACT

An integrated circuit is provided that includes an execution engine and a memory controller. The execution engine is clocked at a first rate and the memory controller is clocked at a second rate that is less than the first rate. Pins on the integrated circuit can transfer data to and from the integrated circuit on both the rising and falling edges of a second clock transitioning at the second clock rate. The integrated circuit is preferably packaged using a lead frame and wire bonds extending from pads on the integrated circuit to corresponding leads. The leads are secured to trace conductors on a surface of a printed circuit board. The board contains no more than two conductive layers separated by a dielectric layer. Thus, an overall electronic system is formed having a board with no more than two conductive layers, an execution engine that receives a first clock signal, a memory controller which receives a second clock signal, and a memory device that sends data to and from the memory controller at twice the rate of the second clock signal. Using a throttled second clock signal allows for less expensive packaging and mounting of packaged integrated circuits on a less expensive PCB, while still maintaining use of a DDR DRAM transfer mechanism.

18 Claims, 4 Drawing Sheets

U.S. PATENT DOCUMENTS

| | | | |
|---|---|---|---|
| 5,826,092 A * | 10/1998 | Flannery | 713/324 |
| 5,856,937 A | 1/1999 | Chu et al. | |
| 5,945,886 A | 8/1999 | Millar | |
| 6,320,758 B1 * | 11/2001 | Chen et al. | 361/782 |
| 6,366,989 B1 | 4/2002 | Keskar et al. | |
| 6,381,164 B1 | 4/2002 | Fan et al. | |
| 6,564,329 B1 * | 5/2003 | Cheung et al. | 713/322 |
| 6,603,828 B1 | 8/2003 | Chiu | |
| 6,781,405 B2 | 8/2004 | Rajan et al. | |
| 6,804,197 B1 * | 10/2004 | Henry et al. | 370/230.1 |
| 6,941,416 B2 | 9/2005 | Dorst | |
| 6,955,941 B2 | 10/2005 | Bolken | |
| 6,971,034 B2 | 11/2005 | Samson et al. | |
| 7,023,719 B1 * | 4/2006 | Hung et al. | 365/63 |
| 7,171,580 B2 * | 1/2007 | Bailey et al. | 713/600 |
| 7,243,254 B1 | 7/2007 | Kuroodi et al. | |
| 7,409,572 B1 * | 8/2008 | Hung et al. | 713/500 |
| 2003/0107908 A1 | 6/2003 | Jang et al. | |
| 2003/0137860 A1 | 7/2003 | Khatri et al. | |
| 2003/0217303 A1 | 11/2003 | Chua-Eoan et al. | |
| 2005/0080999 A1 * | 4/2005 | Angsmark et al. | 711/150 |

OTHER PUBLICATIONS

Kozierok, "The PC Guide: Processor Speed Support," Apr. 17, 2001, retrieved from the Internet at www.pcguide.com.

"TN-46-05, General DDR SDRAM Functionality," Micron Technology, Jul. 2001.

JEDEC Standard, Double Data Rate (DDR) SDRAM Specification, May 2005.

Bakoglu, "Circuits, Interconnections, and Packaging for VLSI," 1990 Addison-Wesley Publishing, p. 321.

* cited by examiner

LOW POWER MEMORY CONTROLLER WITH LEADED DOUBLE DATA RATE DRAM PACKAGE ON A TWO LAYER PRINTED CIRCUIT BOARD

CONTINUING DATA

The present application is a continuation from prior U.S. patent application Ser. No. 10/728,492 filed Dec. 5, 2003 which is incorporated herein by reference.

BACKGROUND OF THE INVENTION

1. Field of Invention

This invention relates to semiconductor memory and, more particularly, to a low power memory controller placed on a two-layer printed circuit board (PCB) with a double data rate (DDR) DRAM, both of which are packaged with leads extending outward from the package and secured to pads on the PCB for a lower cost semiconductor memory system.

2. Description of Related Art

The following descriptions and examples are not admitted to be prior art by virtue of their inclusion within this section.

There are numerous types of memories available in the marketplace. For example, large volumes of data can be stored in magnetic memory, such as a hard disk drive. Lesser quantities of data can be stored in memory arranged upon an integrated circuit, oftentimes referred to as "semiconductor memory." Semiconductor memory is typically arranged closer to the core logic unit, or execution unit, than the hard disk drive and can be accessed much faster than the disk drive.

Common to semiconductor memory is an array of storage cells. Depending on the function of the semiconductor memory, each storage cell can have a significantly different architecture and function. For example, semiconductor memory can be volatile or non-volatile. Types of volatile memory include memory which must be periodically refreshed (DRAMs) or memory that will lose its programmed state if power is removed (SRAMs).

The differences between SRAMs and DRAMs are fairly significant. For example, each cell of SRAM includes latch and pass transistors. Conversely, each cell of DRAM involves simply one transistor. While DRAMs are denser than SRAMs, DRAMs require additional support circuitry to coordinate the access of each cell, along with the need to periodically refresh that cell. The faster access time of SRAMs allow their use as the primary cache of the execution unit, whereas DRAMs are generally used as the main semiconductor memory. SRAMs are, therefore, placed on the same address and data bus as the execution unit, whereas DRAMs are linked to the execution unit by a memory controller and stand-alone memory bus.

In addition to having a memory controller between the array of storage cells (DRAMs) and the execution unit, the DRAMs themselves take on numerous forms: fast page DRAMs, extended data out DRAMs, burst extended data out DRAMs, and the more recent synchronous DRAMs (SDRAMs). SDRAMs take advantage of the fact that memory accesses by the execution unit are typically sequential. SDRAMs are thereby designed to fetch all bits within a particular burst in sequential fashion by allowing the column address to be incremented sequentially and in sync with the system clock of the execution unit or processor.

With the increased access speed of the SDRAM came yet another enhancement to DRAMs in general. Instead of providing source-synchronous data capture at the clock frequency, double data rate (DDR) DRAMs allow data to be captured at twice the rate of the clock frequency. Instead of capturing data once per cycle as in single data rate (SDR) DRAMs, DDR DRAMs utilize a 2n prefetch architecture to allow data to be captured twice per clock cycle. Details of the difference between SDR and DDR are set forth in "General DDR SDRAM Functionality," Micron Technology 2001 (herein incorporated by reference).

While both SDR and DDR DRAMs include the same core memory array of cells, the input/output (I/O) interface is considerably different. For example, DDR utilizes a true and complementary pair of clock signals to formulate the triggering rising and falling clock edges, and also utilizes a data strobe signal (DQS) to drive the data signal (DQ) to and from the memory banks.

One benefit of DDR is the higher speed at which data can be read from or written to the storage cells. Unfortunately, however, the increased speed of the I/O interface within the memory controller limits the available selection of available packing techniques. For example, when the data transfer rate exceeds several 100 MHz, relatively high inductance occur on the data signals sent to and from the memory controller. In an attempt to reduce the inductance, the data pins are kept as short as possible and are placed as close to the ground plane as possible. By shortening the data pins or leads extending from the controller and/or DRAMs and placing those pins near the ground plane, the current loop area and the magnetic flux are minimized. As described in "Circuits, Interconnections, and Packaging for VLSI," 1990, pg. 321 (herein incorporated by reference), packages which incur the poorest lead inductance are dual in-line packages (DIPs) or small outline packages (SOPs) which have approximately 3-50 nH inductance. Packages that have the smallest lead inductance (0.025-1 nH) are those that employ flip-chip technology.

To take full advantage of the higher transfer speeds of DDR, the integrated circuit having the memory controller also has preferably an array of solder bumps arranged on the upper surface of the integrated circuit. The integrated circuit is then flipped over so that the solder bumps are in alignment with solder balls on a single or multi-layer substrate. The "flipped" integrated circuit is then heated along with the substrate, to establish a reflow bond between the integrated circuit and the substrate. Flip-chip mounting with collapsible solder balls provides the least parasitic inductance and capacitance, generally less than 1 nH and less than 1 pF. See "Circuits, Interconnections, and Packaging for VLSI," 1990, pg. 91 (herein incorporated by reference).

While flip-chip mounting techniques enjoy lessened parasitic inductance and capacitance, flip-chip mounting is nonetheless relatively expensive. First, the integrated circuit must be laid out with bonding pads on an upper surface, and one or more ground planes either on the integrated circuit near the solder bumps or on the substrate near the solder balls. Second, the added multi-layer substrate and the added encapsulate process needed to secure the collapsible solder balls increases the overall complexity of the packaged integrated circuit. Third, in addition to the specially configured array of solder bumps and the encapsulate between the collapsible solder balls and solder bumps, flip-chip mounting also requires additional mounting of the substrate-connected integrated circuit to a much larger printed circuit board (PCB).

Instead of requiring a special purpose multi-layer substrate, and flip-chip arrangement of solder balls and bumps, it would be desirable to utilize a less expensive packaging technique. For example, use of a lead frame and wire bonds to form a packaged integrated circuit, and simply mounting the leads onto a PCB without any intervening special-purpose substrate would not only be faster, but less costly to implement than flip-chip mounting. However, if conventional lead frames and wire bonding packages are to be used, it would be desirable to implement modifications to the overall data rate transfer of a DDR DRAM.

In addition to reducing the overall packaging costs of the integrated circuit, additional cost savings must be implemented on the PCB to further reduce costs of the interconnect solution. For example, it would be desirable to introduce DDR transfers in a lower cost small outline package (SOP), with a minimum number of layers formed on the PCB. The desired solution would achieve the benefits of DDR, yet also reduce the costs of packaging, interconnect, and PCB complexity that currently exists in the flip-chip mounting solution.

SUMMARY OF THE INVENTION

The problems outlined above are in large part solved by implementing a memory module that comprises a DDR DRAM, a memory controller, and an execution unit mounted on a PCB. The execution unit and memory controller can be formed on the same integrated circuit, and packaged in a SOP with the integrated circuit mounted on a lead frame paddle, and the leads forming a part of the lead frame itself. The leads will extend from the packaged integrated circuit, and can be solder-bonded directly to the PCB using, for example, various surface mount techniques. Bonding pads on the integrated circuit are preferably coupled to bond fingers on the lead frame via, for example, wires. In addition to the packaged execution unit and memory controller mounted to the PCB, various DRAMs can also be packaged and mounted to the PCB.

The PCB is preferably a multi-layer PCB with a maximum of two conductive layers or planes. The conductive layers are formed by selectively removing a thin sheet of conductive material to produce a plurality of coplanar trace conductors. The trace conductors on each layer comprise conductors that receive signals, a power supply, and ground. The power supply, signal, and ground conductors on each layer are separated by a dielectric layer, and preferably one of the pair of conductive layers is on an outer surface of the PCB. The exposed conductive layer may have one or more conductive pads that receive corresponding leads of the SOP integrated circuit.

By utilizing a lead frame and wire bonds to form the packaged integrated circuits, substantial cost savings can be realized. Moreover, using only two conductive layers rather than four or more can realize additional cost savings. The cost savings, however, are mitigated if the added parasitic inductance and capacitance are unduly large. In order to reduce the parasitic inductance and capacitance on the leads of the SOP surface mounted to the bonding pads on the upper conductive layer of the PCB, a clock throttling technique is used herein to control the data transfer rate.

Clock throttling is used with the advantages of DDR DRAMs. Currently, the marketplace has demonstrated significant demand for DDR as opposed to SDR. As the demand for DDR asynchronous DRAM or DDR SDRAM continues to increase, the costs of DDR will be less than SDR asynchronous DRAM or SDRAM. While further cost savings can be achieved using DDR, clock throttling of DDR is preferably used so that the data transfer rate and the latch speed of the I/O interface of the memory controller does not become unduly fast so as to produce undesirably high parasitic inductance and capacitance. The present memory module is thereby a cost benefit solution to conventional DDR DRAMs that utilize more expensive flip-chip mounting technologies or more expensive SDR DRAMs currently available in the marketplace.

According to one embodiment, an integrated circuit is provided. The integrated circuit includes an execution engine, memory controller, or both an execution unit and a memory controller. The execution engine is preferably clocked at a first clock rate, and the memory controller is preferably clocked at a second clock rate. The second clock rate is desirably less than the first clock rate. A plurality of pins are configured on the integrated circuit and, preferably, extend from the integrated circuit as part of a lead frame. The pins are adapted to transfer data to and from the memory controller on both the rising and falling edges of the second clock signal transitioning at the second clock rate.

A multiplexer can be used to throttle the memory controller to capture data on the plurality of pins at a lessened second clock rate. The multiplexer can be configured to select the second clock rate rather than the first clock rate when, for example, the memory controller receives a power supply voltage. In addition to the memory controller being clocked at a lessened, second clock rate for capturing data on the rising and falling edges of the second clock signal, the memory controller is also preferably coupled to a power supply voltage less than 2.5 volts, for example. The memory controller can preferably utilize differential I/O signals such that the I/O interface of the memory controller receives a power supply in accordance with the stub-series terminated logic (SSTL_2) standard, and not the higher voltage levels (low voltage TTL, or "LVTTL") associated with SDR.

According to another embodiment, an electronic system is provided. The system includes a substrate (herein referred to as a PCB) that comprises a maximum of two conductive layers spaced from each other by a dielectric layer. An execution engine clocked at a first clock rate is connected to possibly a first conductor that extends partially across one of the two conductive layers. A memory controller clocked at a second clock rate can be coupled to a second conductor extending partially across one of the two conductive layers.

A memory device having an array of storage cells is coupled to a third conductor extending partially across one of the two conductive layers. A data bus is coupled between the memory controller and the memory device for transferring data at a rate greater than the first clock rate and substantially twice the second clock rate (i.e., cycle frequency). Thus, if the memory device is DDR DRAM, then data is transferred across the bus at twice the second clock rate. However, the second clock rate is less than the first clock rate which is fed to the execution engine. If the memory device were an SDR SDRAM, for example, then a DDR DRAM will transfer data faster than SDR SDRAM even though the second clock rate is throttled downward compared to the first clock rate.

According to yet another embodiment, a method is provided for transferring data between a memory controller and a memory device. The method includes integrating an execution engine with a memory controller, and clocking the execution engine with a first clock that cycles at a first clock rate while clocking the memory controller with a second clock that cycles at a second clock rate. A memory device formed separate and apart from the integrated execution engine and memory controller is clocked with the second clock. However, data is transferred between the memory controller and the memory device on both the leading and trailing edges of the second clock.

The execution engine and memory controller are packaged upon a lead frame, with bonding pads coupled by a wire to leads extending from the package. Moreover, the memory device is also packaged in a lead frame with a wire connecting bonding pads to leads extending from the package. The packaged execution engine and memory controller are placed upon a printed circuit board (PCB) along with the packaged memory device. The PCB contains no more than two conductive layers spaced from each other by a dielectric layer. At least one of the two conductive layers is on an outer surface of the PCB, and contains bonding pads which receive the surface-mounted packaged integrated circuits.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
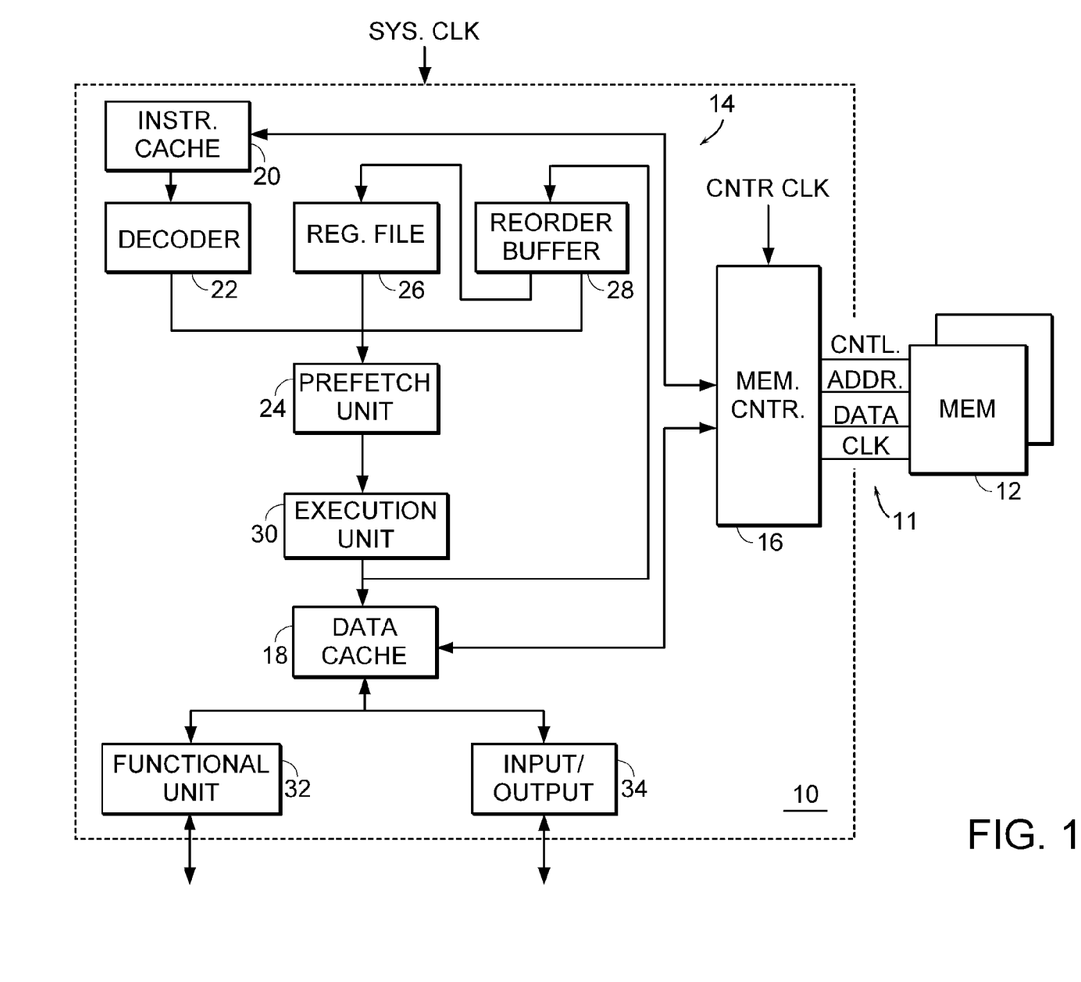
FIG. 1 is a block diagram of an execution engine and memory controller placed on a single monolithic semiconductor substrate, with the memory controller configured to control one or more arrays of semiconductor memory.

Turning now to the drawings, FIG. 1 illustrates a memory module having a series of semiconductor memory devices 12 connected to a memory controller 16. A memory bus 11 is used to convey information between the memory devices 12 and a memory controller 16. Each semiconductor memory device 12 is preferably an asynchronous DDR dynamic random access memory (DRAM) device. Also, each memory device 12 includes an array of storage cells formed on separate chips of a semiconductor wafer, wherein the separate chips are removed and placed on a paddle of a lead frame. The paddle, chip, and a portion of the lead frame are preferably sealed inside a package. The package includes leads that extend from an outer surface of the package. Thereafter, the leads can be forwarded into holes or affixed to conductors on the surface of a PCB. There are various types of packages, some of which are through-hole dual in-line packages (DIP), j-leaded chip carriers, leadless chip carriers, etc., all of which have leads which extend preferably from an outer lateral surface of the package. An example of such packaging includes a small outline package (SOP).

There are numerous types of packaging technologies available in the marketplace. However, it is preferred that the chosen package be of very low cost. Therefore, SOP is preferably utilized as the package of choice. The packaging material can include multiple types of insulating substrates, such as ceramics or polyamides. The leads extending as part of a lead frame include any material which is electrically and thermally conductive, such as metals. Popular lead frame materials include copper, aluminum, tungsten, molybdenum, or a combination of the above.

Each semiconductor memory device 12 can be readily connected through known solder reflow techniques to bond the lower surface of the outward-extending lead to a corresponding upper surface of a bonding pad arranged on the upper surface of the PCB in registry with the corresponding lead. The bonding pads form one end of a printed conductor extending along a conductive layer of the PCB. The printed conductor can be formed by, for example, using a photosensitive material to chemically expose and remove various portions of a planar sheet from the upper surface, leaving a pattern plurality of trace conductors. The upper layer of the trace conductors is formed on the board material, preferably made of an epoxy-bonded fiberglass, sometimes referred to as a FR-4 board. The epoxy-bonded fiberglass is also sometimes referred to as woven glass fabric, wherein special purpose materials, such as polyamide can be included into the fabric to enhance certain characteristics of the laminate material.

Referring again to FIG. 1, semiconductor memory device 12 is shown external to integrated circuit 10. Both memory 12 and integrated circuit 10 are shown having several I/O pins, some of which are reserved for control, address, data, and clock pins. Within integrated circuit 10 are two major subsystems: an execution engine 14 and a memory controller 16. Execution engine 14 is illustrated in part. Preferably, execution engine 14 is a processor. A processor is known to incorporate two operational units: an integer unit and a floating-point unit. These units communicate data via a data cache 18 drawn from, for example, external memory 12. The integer and floating-point units are controlled by a single instruction stream supplied by instruction cache 20. The instruction stream can be drawn from external memory 12, for example. Instruction cache 20 can supply multiple instructions per fetch if, for example, the processor is a superscalar processor. The actual number of instructions fetched can vary. As the instructions are dispatched from instruction cache 20, decoder 22 decodes those instructions and places them into prefetch unit 24.

Prefetch unit 24 works in conjunction with register file 26 and reorder buffer 28 to handle both in-order and out-of-order issues into functional units of execution unit 30. While it generally easy to provide the required instruction bandwidth for sequential instructions since prefetch unit 24 can simply fetch several instructions per cycle in blocks of multiple instructions, it is much more difficult to provide instruction bandwidth in the presence of non-sequential fetches caused by, for example, branches.

Reorder buffer 28 works with the branch prediction techniques to align and merge back into the sequence of instructions various out-of-order instruction issues. The branch prediction can occur either in hardware or software by essentially predicting the outcomes of branches during instruction fetching without waiting for the functional unit 32 to indicate whether or not the branches should be taken. Prefetch unit 24 functions to hold all un-issued instructions regardless of the functional units (e.g., branch functional unit, ALU functional unit, shift functional unit, load functional unit, and store functional unit) within execution unit 30. Only the integer functional units are shown, prefetch unit 24 may be duplicated in the floating-point unit, depending on the implementation of the floating-point unit.

In addition to the functional units within the execution unit 30 producing various data that is temporarily stored in data cache 18, data can also arise from other functional units 32, external to the data flow path of the processor. Functional unit 32 can be attributed to, for example, the data flow path of an external data bus, such as a PCI bus. In addition to external functional units 32, data can also be input directly into the data flow stream or output from the data flow stream directly. The direct input and output of data is shown by block 34. For example, direct memory access can be implemented from a peripheral to and from semiconductor memory 12 without involving an instruction cycle of the processor.

The various blocks shown as reference numerals 18-34 can be synchronized to a system clock, where data is latched on either the rising or falling edges of the system clock. Memory controller 16, however, is synchronized to a controller clock. If it is desired that memory accesses by the execution engine be sequential and synchronized with the system clock, then the controller clock will transition at the same rate as the system clock. Instead, it is desired that memory accesses by the execution engine be asynchronous to accesses by the memory controller 16. Thus, memory controller 16 receives a controller clock that transitions at a different rate than the transitions of the system clock. It is the controller clock cycle that defines the bi-directional data strobe frequency on memory bus 11. FIG. 1 illustrates only the basic signals needed between memory controller 16 and external memory 12. If DDR DRAM continues its price decrease, then it will be beneficial to implement DDR DRAM for memory device 12, rather than SDR SDRAM.

Figure 2:
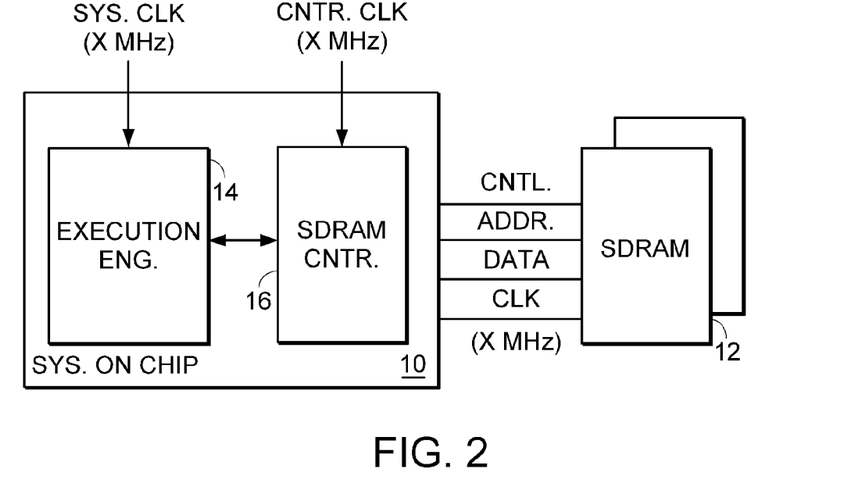
FIG. 2 is a block diagram of the execution engine and memory controller clocked at the same rate for transferring data synchronously between the execution unit and SDRAM semiconductor memory.

FIG. 2 illustrates the rudimentary features of a SDR SDRAM interface. If semiconductor memory 12 is SDRAM, then memory controller 16 is an SDRAM controller. SDRAM memory controller 16 is shown clocked by a controller clock that transitions at the same rate as the system clock sent to the execution engine 14. If the SDRAM is instituted as SDR, then the data transfer rate between controller 16 and SDRAM 12 is equal to the system clock cycle, or X MHz. Transferring data to and from the external memory is, therefore, synchronous with the operation of the execution engine and the memory controller (i.e., each subsystem utilizes the same clock cycle and clock frequency).

Figure 3:
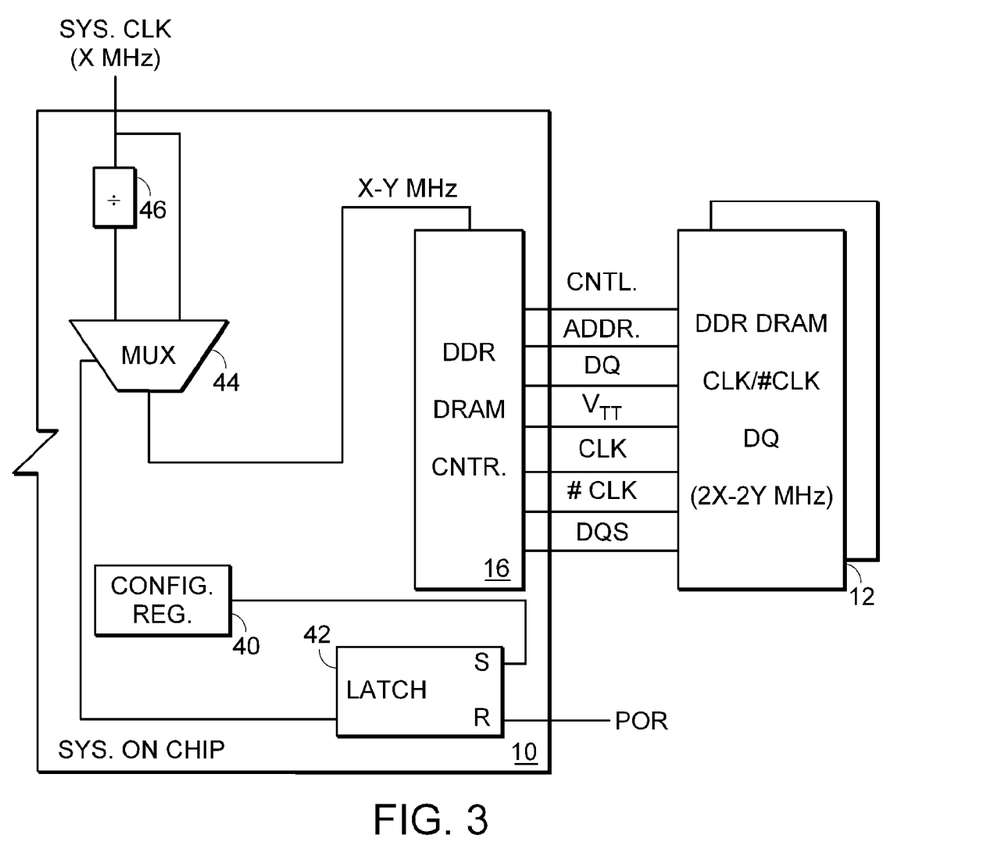
FIG. 3 is a block diagram of the execution engine clocked at a first rate and the memory controller closed at a second rate slower than the first rate to transfer data to and from the DDR DRAM at twice the second rate.

As DDR DRAM continues its price decrease, it is beneficial that the SDR memory device be replaced by DDR memory. FIG. 3 illustrates the various hardware elements used to perform the DDR interface and, more specifically, hardware elements that reduce the controller clock frequency relative to the system clock frequency. By controlling the memory controller with a lessened controller clock frequency, less complex packaging techniques can be used that are not sensitive to large parasitics while still utilizing the lower price-point DDR external memory devices. For example, during boot-up of integrated circuit 10, the basic I/O sequence (BIOS) of the computing system fetches bits of information stored within configuration register 40. If the proper bits are read, latch 42 will sample those bits and maintain a selectivity signal sent to multiplexer 44. Alternatively, the value can be read-in from a reserved pin on integrated circuit 10. Regardless of how the data is read into latch 42, whatever data is present during boot-up is latched onto the output of latch 42 and presented to multiplexer 44.

Multiplexer 44 is shown having two inputs: either the system clock input or the system clock having a reduced frequency. Divider 46 performs this reduction in frequency. If, for example, the reserved bit within configuration register 40 is of the proper logic value, latch 42 will produce a selectivity signal that will select a reduced clock frequency instead of the system clock frequency. The configuration register 40 can be programmed during BIOS operations, for example, to store the configuration bit needed for activating either the full system clock or a reduced system clock. Preferably, the latch will maintain its output until power is removed from integrated circuit 10 during a power-on reset operation.

However, while power is maintained, instead of a first clock signal transitioning at X MHz frequency, a second clock signal transitioning at X-Y MHz is sent to memory controller 16. The second clock is sent in both the true and complementary forms as CLK and #CLK as shown. In addition, controller 16 forwards a separate reference supply voltage ($V_{TT}$). The reference supply voltage is used to apply power to the output driver and receiver circuits, as well as applying pull-up voltage to termination resistors placed on each end of trace conductors which bear the data (DQ) signals that are sent according to the JEDEC standard.

Specifically, the JEDEC standard for DDR transmissions calls out the stub-series terminated logic (SSTL) specification by which the various address and data bus pins are terminated at both controller 16 and external memory 12. The various features of SSTL_2 are described in the JEDEC standard, JEDEC Solid State Technology Association, December, 2000 (herein incorporated by reference). One benefit of the JEDEC standard is that the drivers and receivers are powered at a substantially reduced voltage value. For example, the voltage value for the data lines (DQ) is typically referred to as $V_{DDQ}$, which is defined to be 2.5 volts or less. This allows for a lower power controller and memory device. The termination voltage or $V_{TT}$ is essentially a reference voltage that is approximately equal to ½ of $V_{DDQ}$, for reasons described in the JEDEC standard.

For purposes of the description set forth in FIG. 3, memory controller 16 produces not only the signals needed for SSTL compatibility, but also the true and complementary clock signals to form the data strobe (DQS) signals. DQS is generally a strobe signal that transitions at twice the true or complementary clock rate and dictates the data transfer rate of the bits of data sent across the data bus. SDR does not utilize a data strobe since data transfer is synchronized to the singular clock, not DQS that is twice the transfer rate of the singular clock.

By utilizing a reduced frequency controller clock, memory controller 16 can output data at a reduced rate relative to a memory controller that does not implement a reduced clock frequency. However, memory controller 16 nonetheless maintains compatibility to the lower-cost DDR memory. The lower-speed data rate allows the integrated circuit 10 and semiconductor memory 12 to be packaged with leads extending from a lateral surface, even though such packages and lead arrangements involve a higher parasitic capacitance and inductance. Avoiding flip-chip packaging and the costs associated therewith is one beneficial feature hereof.

Another beneficial feature is that instead of using low voltage TTL (LVTTL) as the signal interface, DDR uses SSTL_2. LVTTL generally requires a power supply of approximately 3.3 volts, whereas SSTL merely requires a power supply of 2.5 volts or lower. Memory controller 16 thereby operates at a lower voltage level to achieve consideration power savings. Still further, DDR is made synchronous to whatever rate DQS happens to be, instead of fixing the DQS rate to be synchronous with the system clock, or twice the rate of the system clock. The DDR DRAM can, therefore, be made to operate asynchronous with the system clock.

SDR generally employs a N-prefetch architecture whereas DDR employs a 2N-prefetch architecture, where the internal data bus is twice the width of the external bus. This allows the internal memory cell to pass data to the input/output buffers in pairs. With DDR, there is no output enable for read operations, but DDR does support a burst terminate command to quickly end a read in process. During a write operation, the DM signal is available to allow the masking of non-valid write data. Since DDR utilizes a differential pair for the system clock, there must also be a true clock and a complementary clock. Positive clock edge for DDR refers to the point where the rising clock signal crosses with the falling complementary clock signal, and the term negative clock edge indicates the transition of the falling clock and the rising complementary clock signals.

Figure 4:
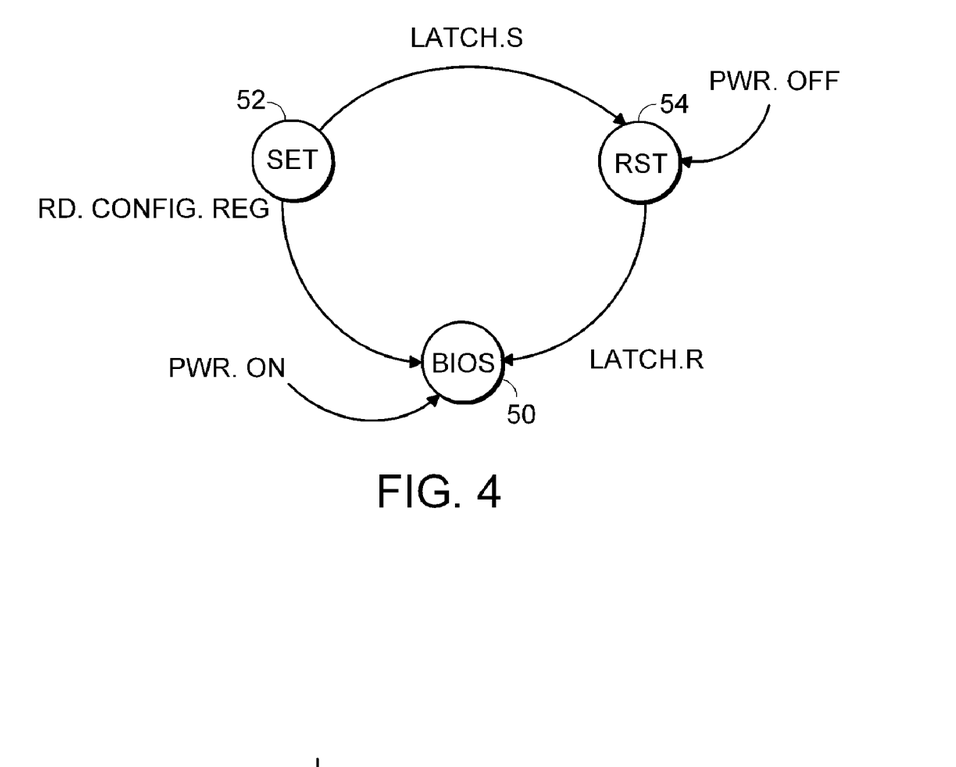
FIG. 4 is a state diagram for setting the clock to the memory controller at the second rate when power is applied to the memory controller.

FIG. 4 illustrates a state diagram of the set and reset states of latch 42 (FIG. 3). A BIOS operation 50 can occur during a power-on reset (PWR_ON) at which the computing system is initiated. During a set state 52, the voltage values within the configuration register are read (RD_CONFIG_REG). Set state 52 remains in the set condition to latch whatever is present on the set input of the latch until reset state 54 occurs. The reset state can occur during a power-off (PWR_OFF). Once the latch is reset, it remains reset until power-on occurs or, in the alternative, a set state is manually initiated.

Figure 5:
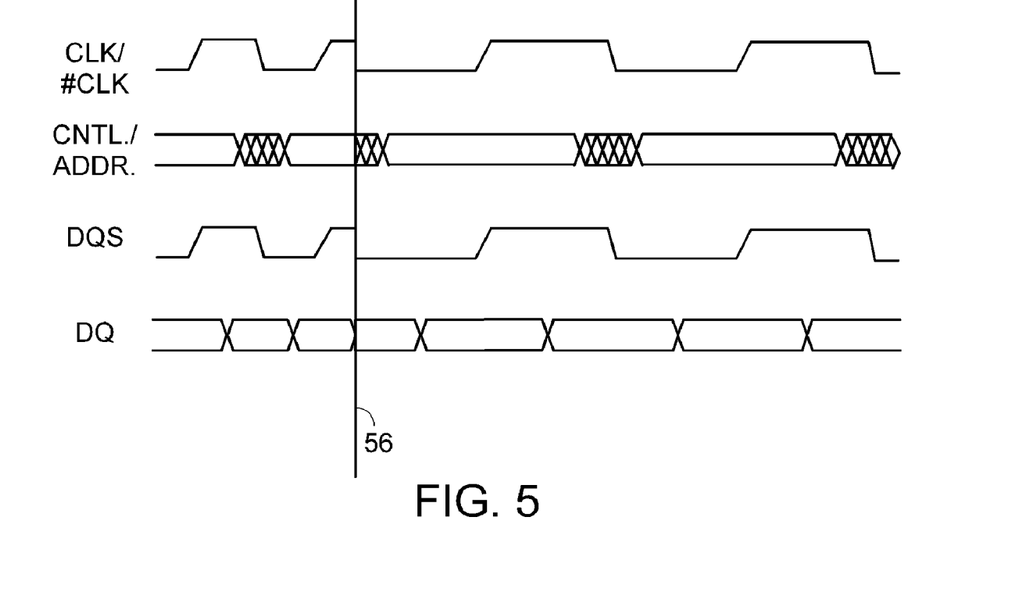
FIG. 5 is a timing diagram of the first and second clock rates, and the effect on data transfer to and from the DDR DRAM when the clock rate is reduced from the first rate to the second rate.

FIG. 5 illustrates a timing diagram of various signals sent between the memory controller and the external memory device. More specifically, FIG. 5 shows the effects of reducing the memory controller clock on those signals. For example, the timing diagram to the left of line 56 indicates signals transitioning as a result of the controller clock transitioning at a first clock rate of X MHz. The timing diagram to the right of line 56 indicates what occurs when the controller clock is throttled to a lower frequency of X-Y MHz. As shown, the true and complementary clocks sent from the memory controller to the memory devices slows down as the control clock signal is throttled down. Moreover, the time slots for controlling and addressing the data is increased, along with the data strobe signal. Since data is captured on both the rising and falling edges of the data strobe signal, the data transfer rate which follows the second clock signal is reduced relative to the data transfer rate that follows the first clock signal (i.e., the first clock signal and its effects are to the left of line 56 and the second clock signal and its effects are to the right of line 56).

Figure 6:
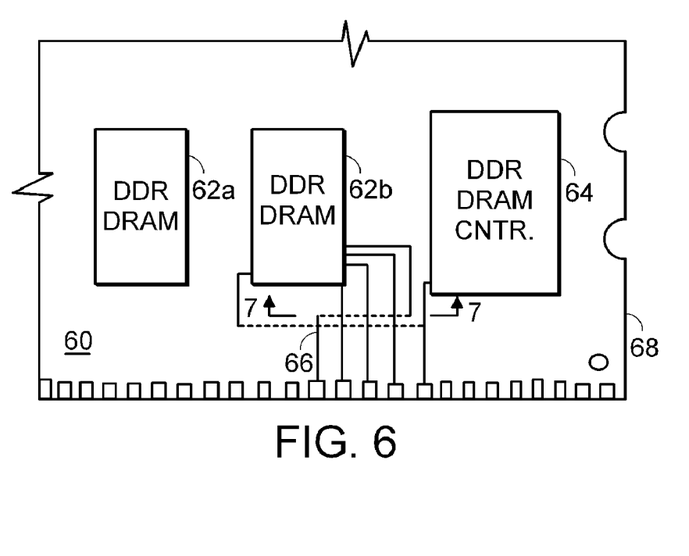
FIG. 6 is a block diagram of DDR DRAM devices arranged on a surface of a PCB, along with a DDR DRAM controller, with trace conductors extending along two dielectrically spaced planes across the PCB.

FIG. 6 illustrates a plan view of a PCB 60 having various packaged chips placed on an upper surface of PCB 60. Packaged chips 62a and 62b can be packaged semiconductor memory 12 (FIG. 3) and, specifically, DDR DRAM. Also placed on PCB 60 is a packaged integrated circuit 64, which is preferably an execution engine integrated with a memory controller. Alternatively, packaged integrated circuit 64 can simply be a memory controller. Various trace conductors 66 are shown extending between, for example, edge connectors 68 and the leads of packaged chips 62 and 64.

Edge connectors 68 can be used to slidably engage into a receptacle, for example. Of course, there could be numerous trace conductors that extend exclusively between packaged chips, and do not extend from a packaged chip to edge connector 68. In addition to transferring signals, trace conductors 66 can also transfer power and ground supplies between chips and/or between edge connector 68 and one or more chips. Trace conductors 66 are made from a conductive material as described above, and are arranged coplanar to each other on two conductive layers separated by a dielectric layer. The power and signal-bearing conductors can be formed on both conductive layers.

Figure 7:
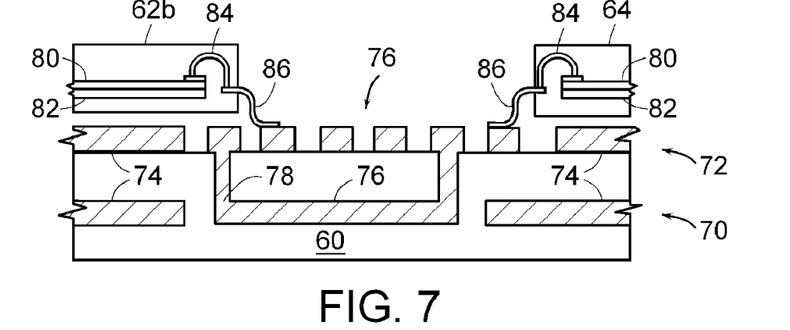
FIG. 7 is a cross-sectional diagram of the PCB and trace conductors along plane 7 of FIG. 6.

FIG. 7 illustrates a cross-sectional view along plane 7-7 of FIG. 6. Specifically, FIG. 7 illustrates PCB 66 having a maximum of two conductive layers. One conductive layer 70 can be dielectrically spaced below another conductive layer 72. Each conductive layer can contain trace conductors for conveying transitory signals, and steady-state power and ground. Preferably, whatever space is not occupied by a signal trace conductor will be consumed with a power and ground trace conductor. Thus, the power and ground trace conductors can be considerably wider than the signal trace conductors. As shown, power and ground trace conductors 74 can be arranged on the upper and/or lower conductive layers to fill the unused areas not bearing signal trace conductors 76. Also shown is a via 78 which might connect a signal trace conductor 76 on an upper surface to a signal trace conductor 76 on the lower conductive layer.

Contrary to PCBs having four or more conductive layers, with possibly separate conductive layers reserved for a power supply plane and a ground supply plane, using only two conductive layers is considerably less expensive to manufacture than PCBs having four or more conductive layers. The degree of complexity further increases whenever vias must extend across two or more intermediate conductive layers. Using a maximum of two conductive layers substantially reduces the cost and complexity of the overall design.

FIG. 7 also illustrates the interior configuration of packaged chips 62b and 64. As shown, the chip 80 can be placed on a paddle 82 within a lead frame. A bonding pad on the upper surface of chip 80 can, therefore, receive a wire bond 84 which extends from the bonding pad to a bond finger also associated with the lead frame. The bonding finger extends outward as a contiguous conductive member from the outer surface of the ceramic or polyamide package, as a lead 86 that is then solder bonded to a corresponding trace conductor 76. Although not shown but understood, adhesives may be used to secure the underside of packaged chips 62b and 64 to the upper surface of PCB 60. The adhesive is preferably thermally insulated and substantially non-conductive.

Figure 8:
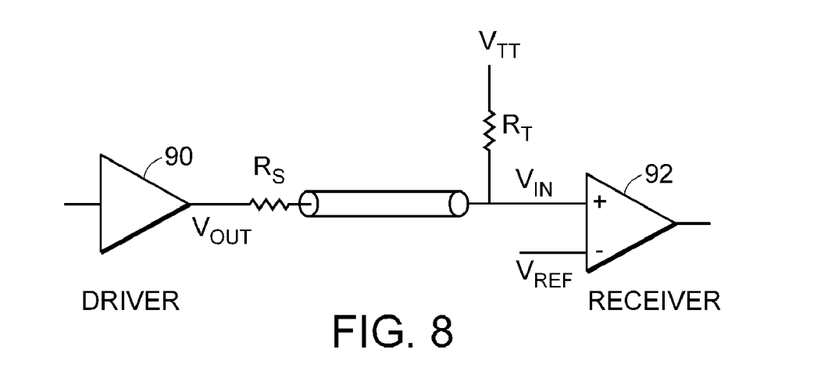
FIG. 8 is a circuit diagram of the circuit elements which drive and receive low power signals across the trace conductors.

FIG. 8 illustrates the preferred mechanism by which each trace conductor between the external memory device and the memory controller, as well as between memory devices, is carried out. Specifically, FIG. 8 illustrates SSTL which includes SSTL versions 1 or 2, oftentimes referred to as SSTL and SSTL_2. At the output of the controller or memory device is a driver 90. The output driver can be achieved by connecting one or a pair of inverters together between a power supply and ground. The output of the inverter is then fed into the trace conductor which has some series resistance ($R_S$). The trace conductor then transfers the corresponding signal to the receiver 92. Indigenous to SSTL technology is a pull-up resistor ($R_T$). The pull-up resistor is used to pull the signal up to the termination voltage ($V_{TT}$). Preferably, the termination voltage is equal to a reference voltage ($V_{REF}$). In some applications, the reference voltage is approximately one-half the device supply voltage ($V_{DD}$). The device supply voltage is also used as a supply voltage for the memory device.

According to one example, the receiver functions as a comparator that compares the input voltage ($V_{IN}$) to the reference voltage ($V_{REF}$). If $V_{IN}$ exceeds $V_{REF}$, then an output will be produced according to well-known comparator and differential pair common source amplifier technology. Because of the high-speed nature at which signals are transferred in DDR memories and the use of SSTL termination at each end of the corresponding trace conductors, the memory controller can maintain relatively high speed data transfers yet at a reduced power supply and with lessened power consumption.

Although the invention has been described in connection with specific and preferred embodiments, it should be understood that the invention as claimed should not be unduly limited to such specific embodiments. Specifically, the memory controller is claimed as being either integrated along with the execution unit or separate from the execution unit (i.e., as a single chip or as two chips). Moreover, the PCB has a maximum of two conductive layers, wherein at least one conductive layer is on an external surface. Both conductive layers can be on the opposed external surfaces if desired. Preferably, however, one conductive layer is embedded between the external surfaces.

Preferably, the memory controller and external memory uses an asynchronous clock design, whereby the system clock frequency is different from the memory controller and external memory clock frequencies. Simply as an example, the system clock frequency might be at 150 MHz whereas the memory controller clock frequency might be reduced to 100 MHz. Since DDR is employed, the data rate is at 200 MHz. By operating the I/O interface on the memory controller at less than the system clock speed which toggles the execution unit and less than the rated speed of the DDR external memory, the raw data rate across the DDR memory data bus will be higher than the data rate achieved with SDR SDRAM, for example. However, since the clock speed of the I/O interface is lower than that used with SDR SDRAM, the power consumption within the integrated circuit which bears the memory controller will be lower using a DDR interface than when using an SDR SDRAM interface. Even though the external memory might be rated at speeds exceeding 266 MHz, for example, the external memory will only be clocked at 200 MHz (assuming in this example that the I/O interface is clocked by a control clock transitioning at 100 MHz).

Performance enhancement is achievable through extensive use of burst-mode transfers and reliance on on-chip cache memory. For example, 100 MHz DDR DRAM clock can be used instead of, for example, 150 MHz SDRAM clock. The reduced clock signal reduces power consumption, as well as parasitic capacitance and inductance at the memory controller pin-out. This will allow use of conventional lead frame packaging and two-layer PCB rather than the more expensive flip-chip packaging and four (or more) layer PCBs. In addition, less expensive DDR DRAM can be used rather than SDR SDRAM, for example. Still further, DDR DRAM manufacturers can specially market lower frequency external memory devices since the present interface does not require operation at the rated speed of that external memory. Thus, DDR DRAMs which might pass 200 MHz functionality but not 266 MHz can be marked (and marketed) to a lower frequency design and, therefore, higher yields might be achievable at the lower speed functional test.

Implementing lower rated speeds and cheaper packaging techniques, as well as cheaper PCBs, provides significant cost savings with enhanced marketability for certain price points. Accordingly, the structures and methods described herein are within the scope and spirit of the present claims, and their equivalents are thereby covered as set forth in the appended claims.

What is claimed is
1. An electronic system, comprising:
at least one substrate comprising at most two conductive layers spaced from each other by a dielectric layer;
an execution engine electrically coupled to a first conductor extending partially across one of the two conductive layers, wherein the execution engine is adapted to receive a first clock signal which cycles at a first clock rate;
a memory controller electrically coupled to a second conductor extending partially across one of the two conductive layers, wherein the memory controller is adapted to receive one of the first clock signal or a second clock signal which cycles at a second clock rate less than the first clock rate; and
wherein the execution engine comprises:
a configuration register adapted to store a logic value;
a multiplexer coupled to receive the first clock signal and the second clock signal; and
a latch having an input coupled to the configuration register and an output coupled to a select input of the multiplexer for selecting the second clock signal in lieu of a first clock signal depending on a logic voltage value stored within the configuration register,
wherein the multiplexer is adapted to provide to the memory controller a selected clock signal that is one of the first clock signal and the second clock signal.

2. The electronic system as recited in claim 1, further comprising:
a memory device electrically coupled to a third conductor extending partially across one of the at most two conductive layers, wherein the memory device comprises an array of dynamitic random access memory cells; and
a data bus extending partially across one of the at most two conductive layers and between the memory controller and the memory device, wherein, when the selected clock signal is the first clock signal, the data bus is adapted to transfer data at substantially the first clock rate and, when the selected clock signal is the second clock signal, the data bus is adapted to transfer data at substantially twice the second clock rate.

3. The electronic system as recited in claim 1, wherein the execution engine and the memory controller are separately packaged integrated circuits each having a plurality of leads extending therefrom.

4. The electronic system as recited in claim 1, wherein the execution engine and the memory controller together comprise a single packaged integrated circuit having a plurality of leads extending therefrom.

5. The electronic system as recited in claim 4, wherein each said execution engine and said memory controller comprise bonding pads and a leadframe having bonding fingers that extend to a plurality of respective leads, and wherein a wire is solder coupled between a respective pair of bonding pads and bonding fingers.

6. The electronic system as recited in claim 4, wherein one of the at most two conductive layers comprises a set of solder pads to which the plurality of leads are solder coupled.

7. The electronic system as recited in claim 1, wherein the execution engine and the memory controller are mounted on an outer surface of the substrate.

8. The electronic system as recited in claim 1, wherein the at most two conductive layers comprises a plurality of laterally spaced conductors comprising copper.

9. The electronic system as recited in claim 1, wherein the dielectric layer comprises epoxy-bonded fiberglass.

10. The electronic system as recited in claim 1, wherein at least one conductor within a first one of the at most two conductive layers is coupled by a conductive via to at least one conductor within a second one of the at most two conductive layers, and wherein at least one of the at most two conductive layers resides on an outer surface of the substrate.

11. The electronic system as recited in claim 2, wherein the terminal ends of the data bus are terminated through pull-up resistors and output drivers connected to a reference supply less than 2.5 volts.

12. The electronic system as recited in claim 11, wherein the pull-up resistors and output drivers comprise termination devices for connecting ends of the plurality of primary and secondary conductors according to stub series terminated logic (SSTL).

13. The electronic system as recited in claim 2, wherein the execution engine and the memory controller are embodied upon a first integrated circuit separate and apart from the memory device embodied upon a second integrated circuit, and wherein both the first and second integrated circuits are packaged in separate thin small outline packages (TSOPs) with leads extending from the each TSOP to corresponding solder pads upon the substrate.

14. A method for transferring data between a memory controller and a memory device, comprising:
    integrating an execution engine with a memory controller;
    storing a logic value within a configuration register of the execution unit, wherein (i) when the memory device comprises an array of SDR DRAM cells, the stored logic value is a first state, and (ii) when the memory device comprises and array of DDR DRAM cells, the stored logic value is a second state of the logic value;
    clocking the execution engine with a first clock that cycles at a first clock rate;
    clocking the memory controller with a selected clock that is one of: (i) the first clock rate when the stored logic value comprises the first state, and (ii) a second clock that cycles at a second clock rate, which is less than the first clock rate, when the stored logic value comprises the second state;
    clocking a memory device, formed separate and apart from the integrated execution engine and memory controller, with the selected clock; and
    transferring data between the memory controller and the memory device, wherein when the selected clock signal is the first clock signal, the data is transferred at one of the leading or trailing edges of the selected clock, and, wherein when the selected clock signal is the second clock signal, the data is transferred at both the leading and trailing edges of the selected clock.

15. The method as recited in claim 14, wherein the step of storing is performed during boot-up of an electronic system comprising the execution unlit, memory controller and memory device.

16. The method as recited in claim 14, further comprising:
    packaging the integrated execution engine and memory controller;
    packaging the memory device;
    coupling the packaged integrated execution engine and memory controller to a printed circuit board;
    coupling the packaged memory device to the printed circuit board; and
    wherein the printed circuit board comprises a plurality of conductors arranged within a maximum of two conductive layers spaced from each other by a dielectric layer.

17. The method as recited in claim 16 further comprising terminating opposing first and second ends of each of said plurality of conductors that accommodates the transfer of data with a pull-up resistor to a power supply having a voltage value dissimilar from a voltage value placed on the memory device, and wherein the voltage value placed on the pull-up resistor is less than 2.5 volts.

18. The method as recited in claim 16 further comprising terminating opposing first and second ends of each of said plurality of conductors according to stub series terminated logic (SSTL).

* * * * *